United States Patent [19]
Nakajo

[11] Patent Number: 5,485,449
[45] Date of Patent: Jan. 16, 1996

[54] METHOD AND DEVICE FOR RECORDING DATA ON AN OPTICAL DISC

[75] Inventor: Yukihisa Nakajo, Hamamatsu, Japan

[73] Assignee: Yamaha Corporation, Hamamatsu, Japan

[21] Appl. No.: 57,700

[22] Filed: May 4, 1993

[30] Foreign Application Priority Data

May 8, 1992 [JP] Japan .................................. 4-143157

[51] Int. Cl.$^6$ .................................................. G11B 7/007
[52] U.S. Cl. ........................... 369/116; 369/100; 369/109; 369/59
[58] Field of Search ..................... 369/100, 109, 369/111, 116, 121, 122, 54, 59, 44.22

[56] References Cited

U.S. PATENT DOCUMENTS

| | | | |
|---|---|---|---|
| 4,873,680 | 10/1989 | Cherng et al. ........................ | 369/116 |
| 4,998,237 | 3/1991 | Osakabe et al. ...................... | 369/109 |
| 5,003,527 | 3/1991 | Matsumoto et al. .................. | 369/100 |

Primary Examiner—Paul M. Dzierzynski
Assistant Examiner—Keit T. Nguyen
Attorney, Agent, or Firm—Spensley Horn Jubas & Lubitz

[57] ABSTRACT

An optical disc recording device includes a motor for rotating an optical disc, a rotation speed control circuit connected to the motor for controlling a rotation speed of the optical disc, a data recording device for, during an irradiation time, irradiating a laser beam on the rotating optical disc in accordance with digital data to be recorded, wherein a pit having a length is formed on the optical disc, a recording speed setting device for designating a desired recording constant linear velocity, an irradiation time control circuit for controlling an actual irradiation time of the data recording device in accordance with a designated recording speed, wherein the actual irradiation time compared with predetermined irradiation time corresponding to a pit to be recorded is shortened in accordance with the designated recording speed, and a laser power control circuit for controlling a laser power of the laser beam to be irradiated for obtaining a predetermined pit length at the actual irradiation time. The irradiation time control circuit controls in such a manner that, when the recording speed is low, a ratio of amount of shortening of the actual irradiation time to the predetermined irradiation time is large and, when the recording speed is high, the ratio of the amount of shortening of actual irradiation time to the predetermined irradiation time is small.

8 Claims, 9 Drawing Sheets

FIG. 3A  LASER POWER SMALL ASYMMETRY +8%

FIG. 3B  LASER POWER MEDIUM ASYMMETRY −5%

FIG. 3C  LASER POWER LARGE ASYMMETRY −12%

METHOD AND DEVICE FOR RECORDING DATA ON AN OPTICAL DISC

BACKGROUND OF THE INVENTION

This invention relates to a method and a device for recording data on an optical disc by irradiating laser beam on a recording surface of an optical disc and, more particularly, to a method and device of this type which, in a case where a recording speed can be varied, is capable of preventing deterioration of quality in a recorded signal regardless of a selected recording speed.

Figure 2:
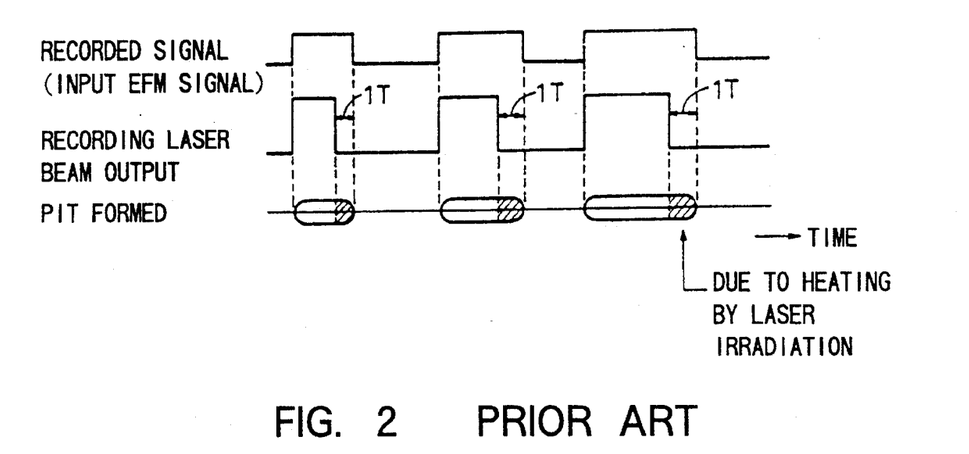
FIG. 2 is a time chart showing the prior art recording method according to the (n-1) strategy.

As one of systems for recording data on a writable optical disc, there is a CD-WO (Compact Disc Write Once) system. In this system, a write once type recording is performed in accordance with the CD format. In this CD-WO system, a recording pit length of 3T to 11T (1T= 1/4.3218 MHz=231 ns) is employed as recording data. If laser beam of a pulse width equivalent to length of a pit to be formed is irradiated, a pit actually formed becomes longer by about 1T than the object pit length due heating of the disc. Hence, so-called (n-1) strategy is adopted according to which, as shown in FIG. 2, recording laser beam is irradiated with a pulse width (n-1)T which is shorter by 1T than length of an object pit to be formed (e.g., a pulse width of 2T when an object pit of 3T is to be formed and a pulse width of 3T when an object pit of 4T is to be formed).

In recording data on an optical disc, it is convenient to provide a recording device with a function of recording data not only at a normal recording speed but also at a higher recording speed such as double speed, quadruple speed etc. which will shorten recording time. As a case of using a quadruple recording speed, there can be a case, for example, where data (e.g., CD-ROM data or digital audio data) to be recorded is stored in a hard disc, this data is read out in a quadruple compressed form and recorded on an optical disc by rotating the optical disc (CD-WO disc) at a quadruple recording speed. As a case of using a double recording speed, there can be a case, for example, where data is reproduced from a Compact Disc by rotating a Compact Disc player at a double speed and copying the data on an optical disc (CD-WO disc) by driving the optical disc at a double recording speed.

It has however been found as a result of experiments that, in a case where data is recorded at a higher recording speed than a normal recording speed with irradiation time of recording laser beam being always maintained at (n-1)T, there occurs increasing deterioration of quality in a recorded signal such as increase of crosstalk (i.e., leakage of a signal between adjacent tracks) as the recording speed becomes higher.

It is, therefore, an object of the invention to provide a method and a device for preventing deterioration of quality in a recorded signal regardless of the recording speed.

SUMMARY OF THE INVENTION

For achieving the above described object of the invention, there is provided an optical disc recording device comprising, rotation driving means for rotating an optical disc, rotation speed controlling means connected to said rotation driving means for controlling a rotation speed of the optical disc, data recording means for, during an irradiation time, irradiating a laser beam on the optical disc rotated by said rotation driving means in accordance with digital data to be recorded, wherein a pit having a length is formed on the optical disc, recording speed setting means for designating a desired recording speed, the recording speed being a constant linear velocity, irradiation time control means for controlling real irradiation time of said data recording means in accordance with a recording speed designated by said recording speed setting means, wherein the real irradiation time compared with predetermined irradiation time corresponding to a pit to be recorded is shortened in accordance with the designated recording speed, and laser power control means for controlling a laser power of the laser beam to be irradiated for obtaining a predetermined pit length at the real irradiation time determined by the irradiation time control means.

For achieving the object of the invention, there is also provided a device for recording data on an optical disc by forming a pit on the optical disc by irradiating recording laser beam in accordance with length of a pit to be formed comprising, recording speed setting means for setting a recording speed, rotation control means for rotating and driving the optical disc at the recording speed set by the recording speed setting means, irradiation time control means for irradiating the recording laser beam in such a manner that, when the recording speed is low, the ratio of the amount of shortening of the actual irradiation time with respect to the predetermined irradiation time corresponding to length of the pit to be formed is large and, when the recording speed is high, the ratio of the amount of shortening of the actual irradiation time with respect to the predetermined irradiation time corresponding to the length of the pit is small, and laser power control means for controlling a laser power of the recording laser beam to be irradiated for obtaining a predetermined pit length at the actual irradiation time determined by the irradiation time control means.

According to the method of the invention, the ratio of the amount of shortening of the actual irradiation time with respect to the predetermined irradiation time is made small when the recording speed is high and, therefore, the laser power can be made correspondingly low whereby increase in crosstalk can be prevented. Likewise, the ratio of the amount of shortening of the actual irradiation time with respect to the predetermined irradiation time is made large when the recording speed is low and, therefore, the laser power can be made correspondingly high whereby clearer cutting of the pit can be realized and increase in jitter can thereby be prevented. Accordingly, increase in crosstalk and jitter can be prevented regardless of the recording speed whereby deterioration of quality in a recorded signal can be prevented.

According to the device of the invention, the above described method for recording data on an optical disc according to the invention can be realized.

A preferred embodiment of the invention will be described below with reference to the accompanying drawings.

DESCRIPTION OF PREFERRED EMBODIMENTS

An embodiment of the invention will now be described.

In this embodiment, data is recorded on a dye type WO disc with the CD-WO format and the recording speed is made variable between a normal speed (x1), double speed (x2) and quadruple speed (x4). In this embodiment, $\alpha$ in $(n-\alpha)T$ is defined as the ratio of the amount of shortening of actual irradiation time with respect to predetermined irradiation time of the laser beam. In this specification, an adjustment of the actual irradiation time to $(n-\alpha)T$ with respect to length nT of a recorded signal is called "modulation", "the ratio of the amount of shortening" of the actual irradiation time with respect to the predetermined irradiation time is expressed by "length of the manner of modulation". When the ratio $\alpha$ is large (i.e. the actual irradiation time is made relatively short), the manner of modulation is called "short" and when $\alpha$ is small (i.e., the irradiation time is made relatively long), the manner of modulation is called "long".

First, an embodiment of the optical disc recording method according to the invention will be described. "Asymmetry" is a parameter for evaluating the quality of a recorded signal on an optical disc. Asymmetry represents degree of deviation of the center of an eye in an eye pattern of an RF signal reproduced from an optical disc from the center of oscillation. This deviation produces jitter which causes a reading error and, therefore, it is necessary to record data so that asymmetry will come within a predetermined range.

Figure 3A:
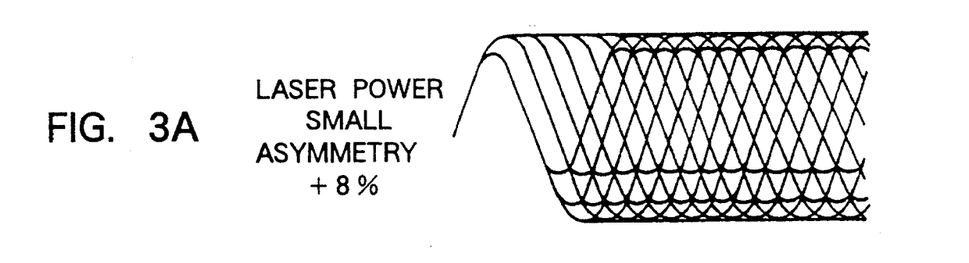
FIGS. 3A to 3C are eye patterns of a reproduced RF signal in cases where the laser power is changed variously while the recording speed multiplying factor and the manner of modulation remain constant.
Figure 3B:
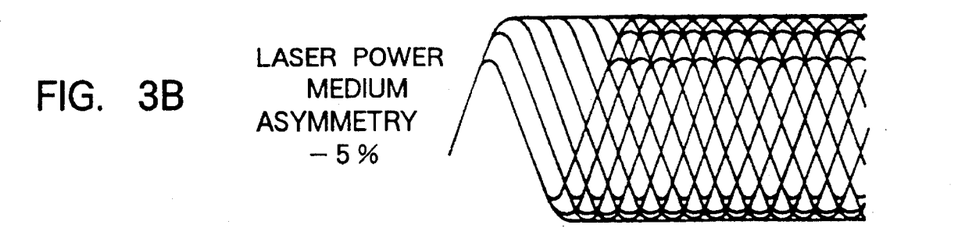
Figure 3C:
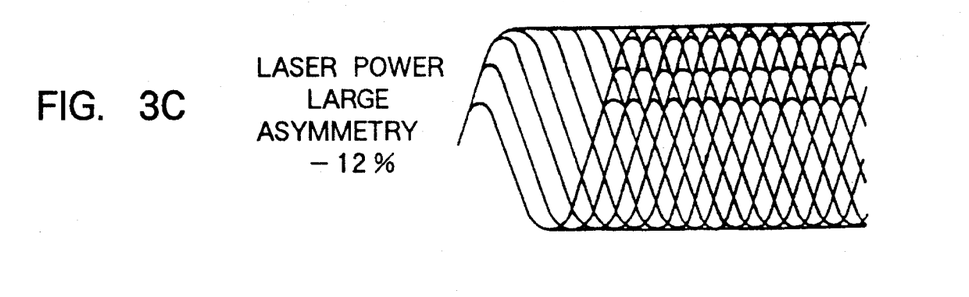

As an element which changes asymmetry, there is laser power during recording. Examples of eye patterns of a reproduced RF signal in a case where data is recorded with the laser power being changed while the manner of modulation and recording speed multiplying factor remain constant are shown in FIGS. 3A to 3C. FIG. 3A shows a case where the laser power is small, FIG. 3B a case where the laser power is medium and FIG. 3C a case where the laser power is large. A value representing the position of 3T expressed in terms of asymmetry is +8%, −5% and −12% respectively. As amounts depending upon the laser power, there are jitter and c1 error. A range of laser power within which both jitter and c1 error are held below predetermined values is herein called "power margin". This power margin varies depending upon the type of disc and the manner of modulation. According to experiments, a power margin was set to a range in which jitter is 30 nsec or below and c1 error is 20 frame/sec or below in average. In this case, the lower limit of the power margin was 5 mW and the upper limit was not defined. A point at which laser power has sufficient allowance toward the upper and lower limits and jitter is held at a small value is sought within the range of the power margin thus obtained and it was found that an optimum condition existed at a point at which asymmetry was −5%.

Figure 4:
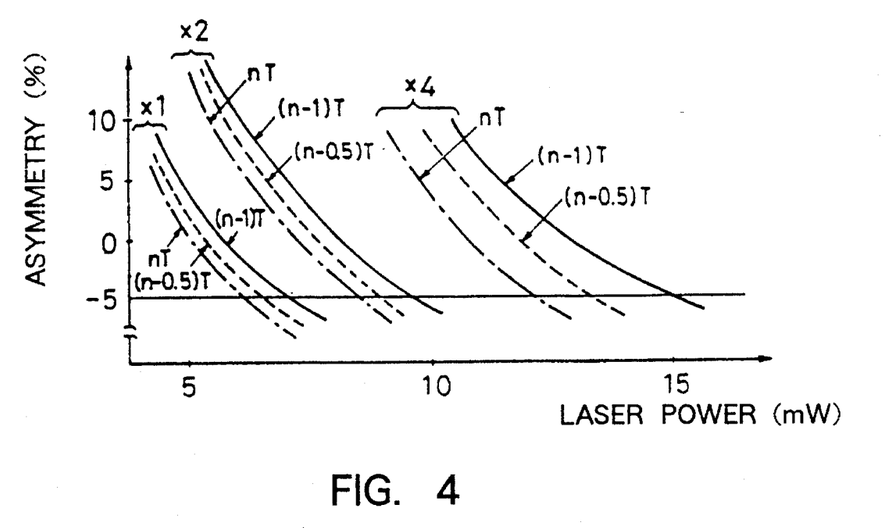
FIG. 4 is a graph showing relation between laser power and asymmetry in cases where the recording multiplying factor and the manner of modulation are changed variously.

On the other hand, asymmetry varies with the manner of modulation and recording speed multiplying factor. Relation between laser power and asymmetry in a case where the manner of modulation and recording speed multiplying factor are variously changed is shown in FIG. 4. Accroding to this figure, laser power which can obtain asymmetry of −5% which was found optimum in the above described experiments is as described in the following table 1:

TABLE 1

| manner of modulation | Laser Poewr (mW) Recording speed multiplying factor | | |
| --- | --- | --- | --- |
| | x1 | x2 | x4 |
| (n − 1)T | 7.2 | 9.8 | 15.0 |
| (n − 0.5)T | 6.9 | 9.2 | 13.2 |
| nT | 6.2 | 8.6 | 12.0 |

Figure 5:
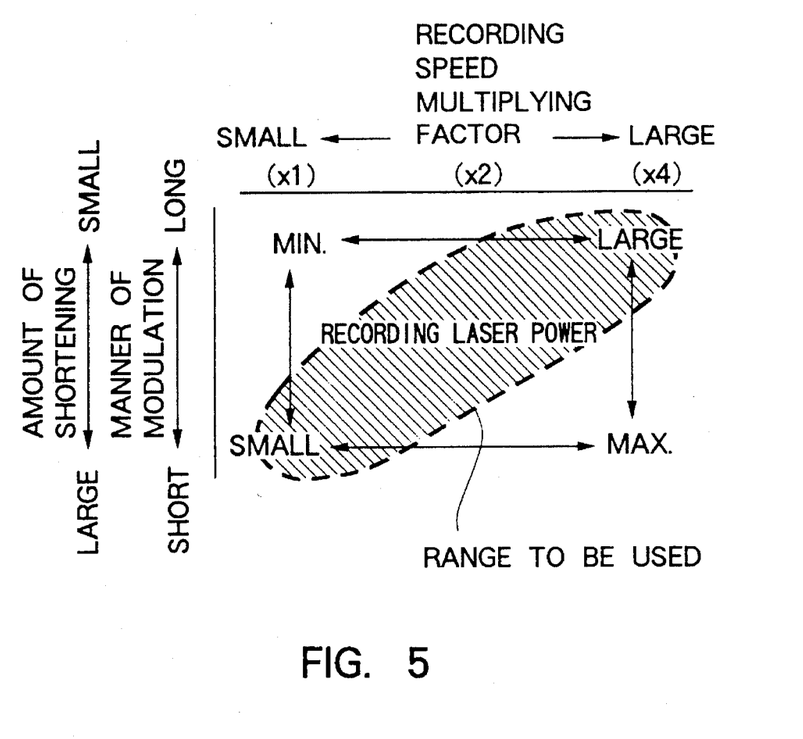
FIG. 5 is a graph schematically showing change in the recording laser power for making asymmetry constant in various combinations of the manner of modulation and the recording speed multiplying factor.

Accordingly, laser power for obtaining a certain asymmetry changes as schematically shown in FIG. 5 depending upon the manner of modulation and recording speed multiplying factor.

Figure 6:
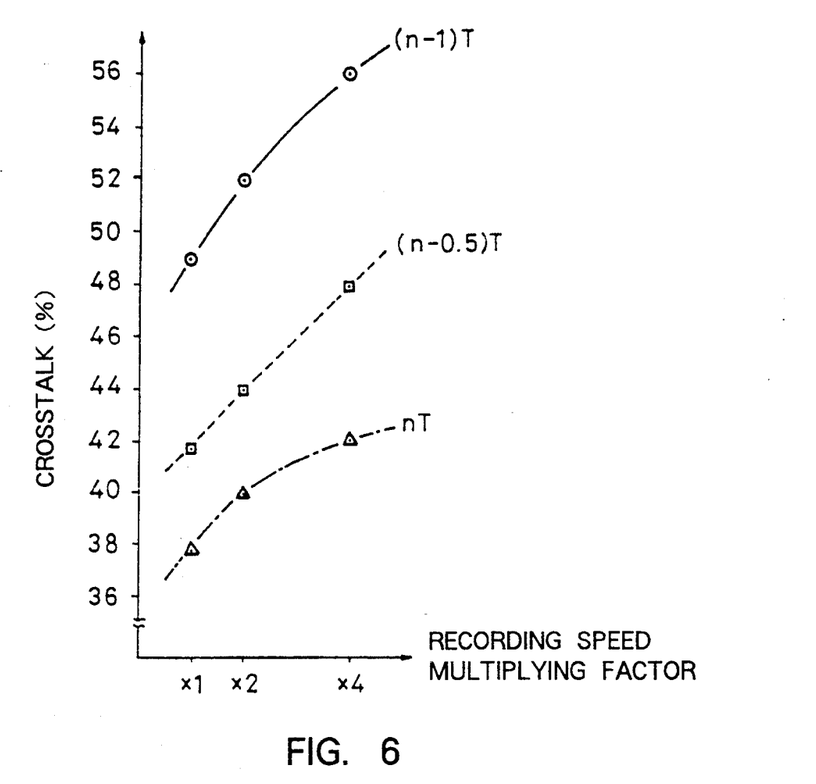
FIG. 6 is a graph showing change in crosstalk in a case where the recording laser power is changed as shown in FIG. 5.
Figure 7A:
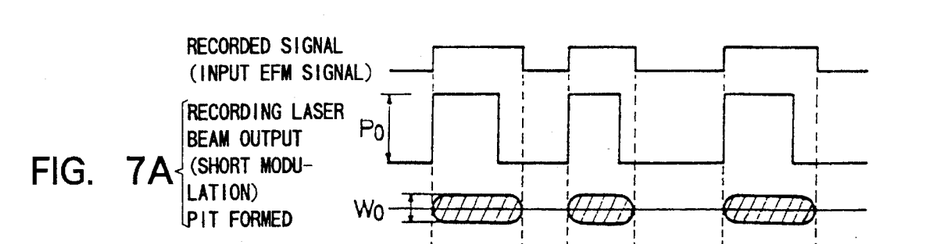
FIGS. 7A and 7B are diagrams showing difference in the pit shape in cases where the manner of modulation is changed while the recording speed multiplying factor remains constant.
Figure 7B:
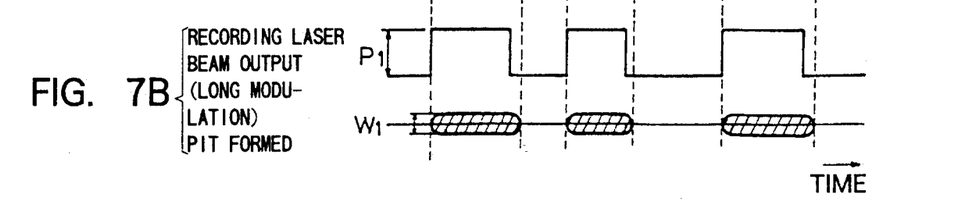

Change in crosstalk in a reproduced signal in a case where data is recorded with laser power being changed as shown in Table 1 is shown in FIG. 6. According to this figure, it will be understood that the shorter the manner of modulation and the higher the recording speed multiplying factor, the larger is crosstalk. This is because a higher laser power is required as the manner of modulation becomes shorter and the recording speed multiplying factor becomes higher so that lateral (i.e., in the direction of the track width) dissipation of heat becomes large with resulting increase in the width of a recorded pit (i.e., width of recorded data in the radial direction of the disc). By way of example, difference in the pit shape in a case where a pit of the same length is formed with the manner of modulation being changed while the recording speed multiplying factor remains constant is shown in FIGS. 7A and 7B. FIG. 7A shows a case where data is recorded with a manner of modulation which is relatively short and FIG. 7B shows a case where data is recorded with a manner of modulation which is relatively long. It will be understood from these figures that, since the laser power is larger in the case of FIG. 7A than in the case of FIG. 7B, i.e., P0>P1, the width of the recorded pit is larger in the case of FIG. 7A than in the case of FIG. 7B, i.e., W0>W1.

Figure 8A:
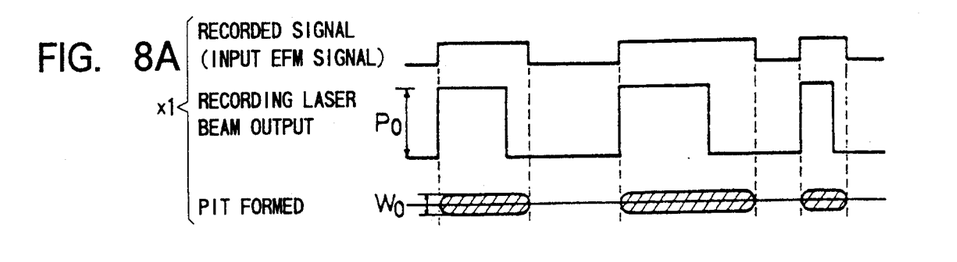
FIGS. 8A and 8B are graphs showing difference in the pit shape in cases where the recording speed multiplying factor is changed while the manner of modulation remains constant.
Figure 8B:
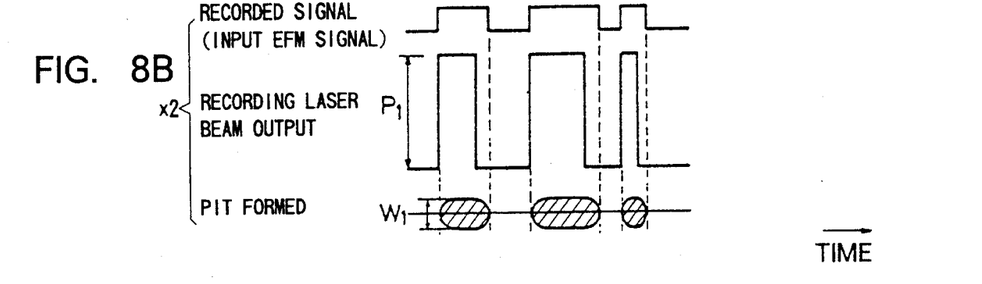

Similarly, difference in the pit shape in a case where a pit of the same length is formed with the recording speed multiplying factor being changed while the manner of modulation remains constant is shown in FIGS. 8A and 8B. FIG. 8A shows a case of a normal speed (x1) and FIG. 8B shows a case of double speed. According to these figures, it will be understood that, since laser power is larger in the case of FIG. 8B than in the case of FIG. 8A, i.e., P0<P1, the width of the recorded pit is larger in the case of FIG. 8B than in the case of FIG. 8A, i.e., W0<W1.

Figure 9:
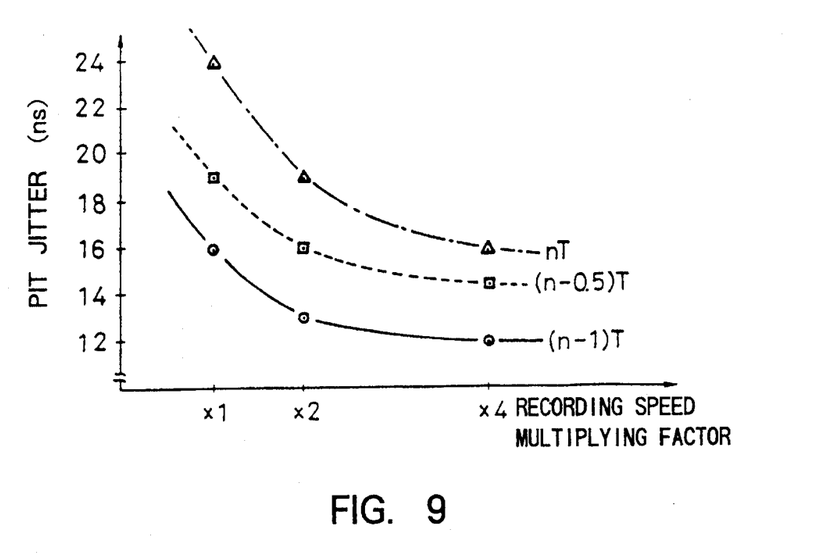
FIG. 9 is a graph showing change in pit jitter in a case where the recording laser power is changed as shown in FIG. 5.
Figure 10:
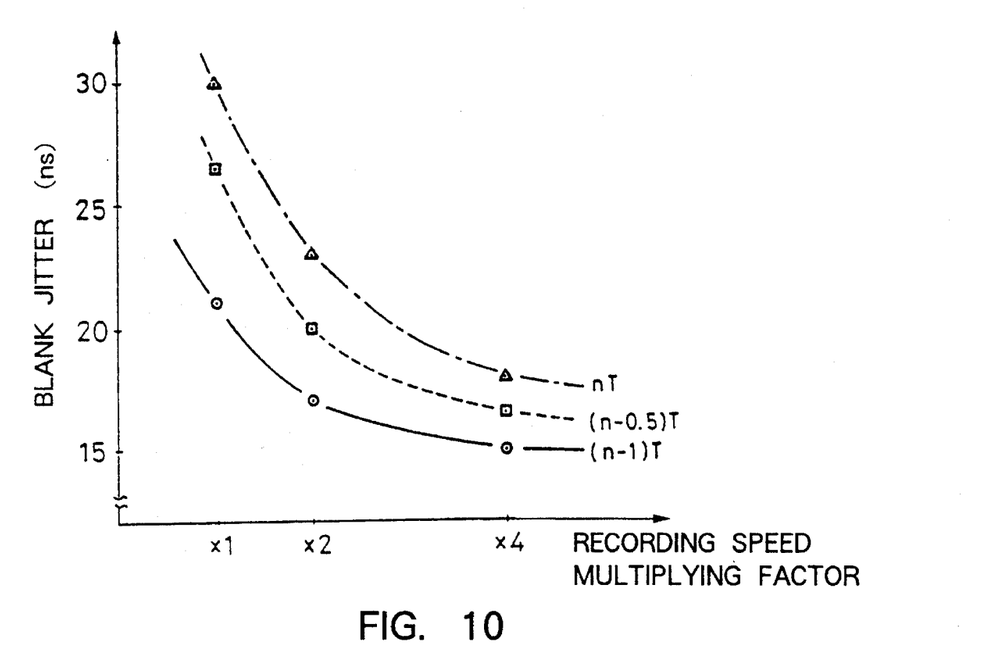
FIG. 10 is a graph showing change in blank jitter in a case where the recording laser power is changed as shown in FIG. 5.

Pit jitter and blank jitter of a reproduced signal in a case where data is recorded with laser power being changed as shown in Table 1 are shown in FIGS. 9 and 10. According to these figures, it will be understood that the longer the manner of modulation and the smaller the recording speed multiplying factor, the larger is jitter. This is because laser power becomes lower as the modulation is longer and the recording speed multiplying factor is smaller so that clear cutting of the pit becomes difficult.

Accordingly, for preventing increase in crosstalk and jitter, the shaded range in FIG. 5 which avoids portions where laser power becomes maximum and minimum should be used. For this purpose, when the recording speed multiplying factor is small, the manner of modulation should be shortened whereas when the recording speed multiplying factor is large, the manner of modulation should be prolonged. More specifically, the manner of modulation should be changed within the shaded range in FIG. 1A in accordance with the recording speed multiplying factor. That is, the amount of shortening of irradiation time is set to 1.3 to 1.0 at the normal speed, 1.0 to 0.5 at the double speed and 0.5 to 0 at the quadruple speed.

As to laser power used in this case, there are various factors which determine laser power such, for example, as the type of disc (e.g., sensitivity to a dye used), the type of head (NA (numerical aperture) of objective lens and light wavelength) and the manner of modulation and, therefore, it is not possible to simply determine a definite level of laser power at a given recording speed multiplying factor. What can be said is that, when these conditions are fixed, laser power of 1.4 times at the double speed and laser power of double at the quadruple speed are respectively required as compared with laser power at the normal speed. Citing, for example, values of laser power in a case where a DQ disc made by Taiyo Yuden K.K. is used, NA value of the objective lens of the head is 0.5, light wavelength is about 790 nm and the normal linear velocity is 1.4 m/see, the value of laser power is set at 8.0 mW to 9.5 mW at the normal speed, 10.0 mW to 12.5 mW at the double speed and 13.0 mW to 16.0 mW at the quadruple speed. Laser power can generally be made small by adopting a large NA value of an objective lens of a head, shortening light wavelength or decreasing the linear velocity. By variably controlling the manner of modulation and laser power in accordance with the recording speed multiplying factor, a pit of a desired pit length can be formed while preventing effectively occurrence of crosstalk and jitter.

Figure 11:
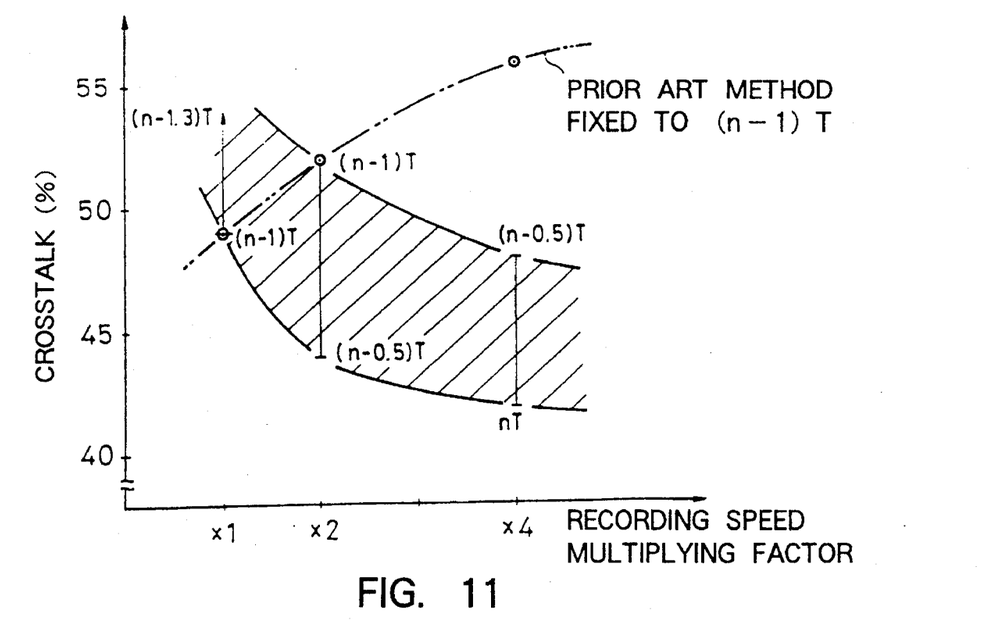
FIG. 11 is a graph showing change in crosstalk in a case where the manner of modulation and the laser power are changed as shown in FIG. 1.
Figure 12:
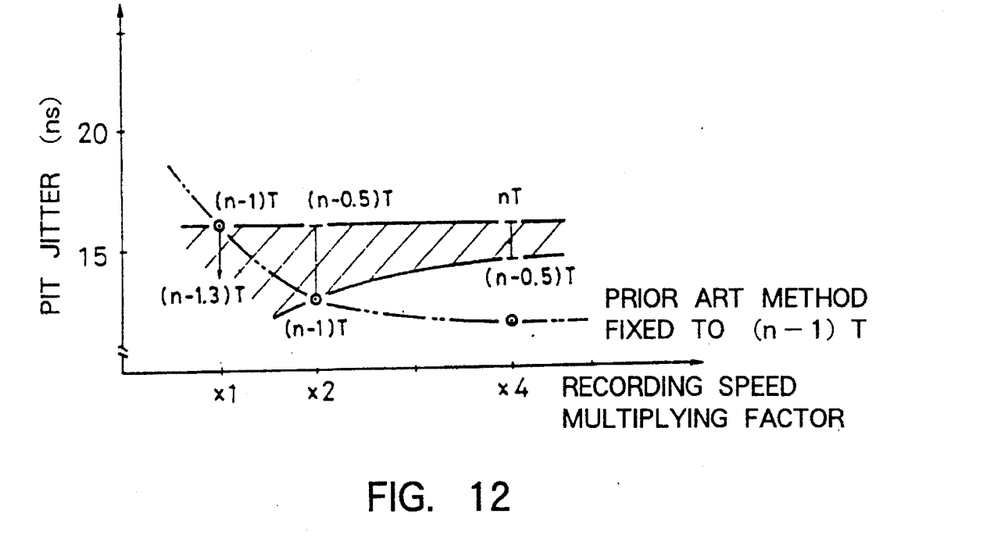
FIG. 12 is a graph showing change in pit jitter in a case where the manner of modulation and the laser power are changed as shown in FIG. 1.
Figure 13:
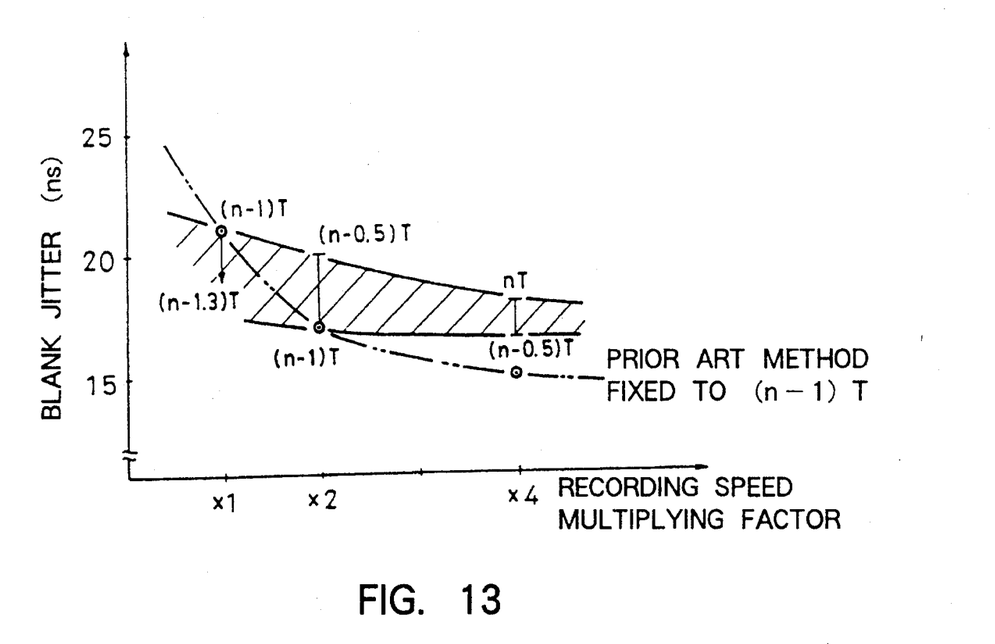
FIG. 13 is a graph showing change in blank jitter in a case where the manner of modulation and the laser power are changed as shown in FIG. 1.

Change in crosstalk in a reproduced signal in a case where data is recorded with both the manner of modulation and recording speed multiplying factor being changed is shown in FIG. 11. Likewise, changes in pit jitter and blank jitter are shown in FIGS. 12 and 13. According to these figures, it will be understood that both crosstalk and jitter are averaged as compared with the case where the manner of modulation is constant regardless of the recording speed multiplying factor whereby excessive increase in crosstalk and jitter can be prevented.

An embodiment of the optical disc recording device according to the invention will now be described.

Figure 14:
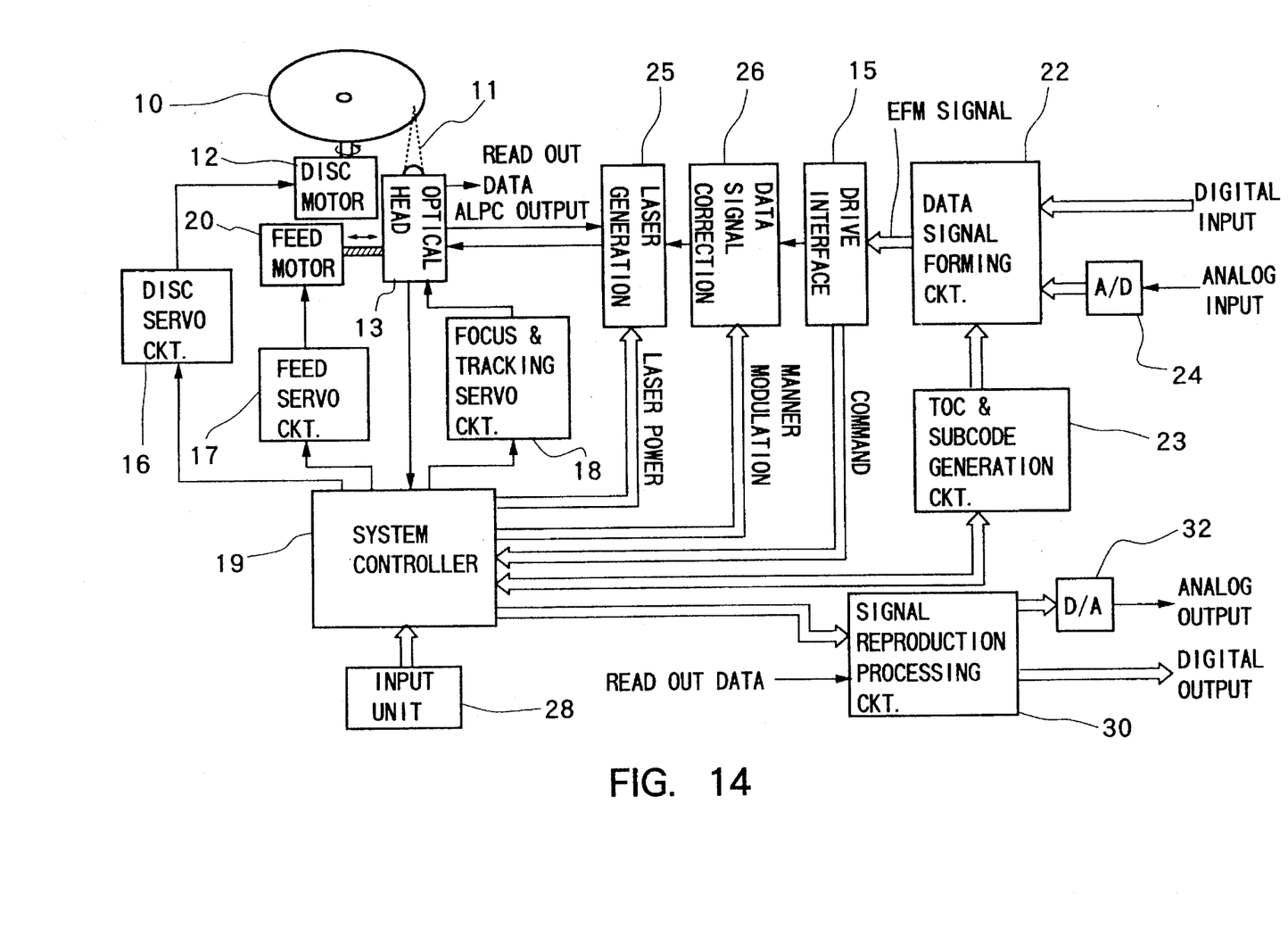
FIG. 14 is a block diagram showing an embodiment of the optical disc recording and reproducing device according to the invention.

FIG. 14 shows an entire construction of an optical disc recording device to which the invention is applied. An input unit 28 sets a recording speed multiplying factor by operation of an unillustrated operator.

In response to a command from a system controller 19, a disc servo circuit 16 causes a disc motor 12 to rotate and drive at a set recording speed multiplying factor and at a constant linear velocity. This constant linear velocity control is made by an operation control based on the position of an optical head 13.

A focus servo and tracking servo circuit 18 controls, in response to a command from the system controller 19, focus and tracking of laser beam 11 irradiated from a semiconductor laser provided in the optical head 13. The tracking control is made by detecting a pregroove formed on the disc 10. A feed servo circuit 17 drives, in response to a command from the system controller 19, a feed motor 20 to move the optical head 13 in the radial direction on the disc 10.

An input signal to be recorded on the optical disc 10 is applied at a speed corresponding to the recording speed multiplying factor to a data signal forming circuit 22 either directly in case it is a digital signal or through an analog-to-digital converter 24 in case it is an analog signal. The data signal forming circuit 22 applies interleave to input data and thereby impart it with an error check code, imparts it with TOC (table of content) information and subcoding information generated by a TOC and subcode generation circuit 23, and EFM-modulates it to form and output a series of serial data at the CD format and at a transfer rate corresponding to the recording speed multiplying factor.

This data is supplied through a drive interface 15 to a data signal correction circuit 26 where it is subjected to the modulation according to the invention and thereafter it is applied to a laser generation circuit 25. In response to the data signal, the laser generation circuit 25 drives the semiconductor laser in the optical head 13 to irradiate laser beam on the recording surface of the optical disc 10 and thereby record data by forming a pit thereon. The laser power during this recording is ordered to a value corresponding to the recording speed multiplying factor according to the invention and is controlled at a high accuracy to the ordered power by an ALPC (automatic laser power control) circuit (not shown). By this arrangement, data is recorded on the optical disc 10 at a format, transfer speed and linear velocity (1.2 m/s to 1.4 m/s) of the CD format.

By reproducing data by irradiating reproducing laser beam (having a smaller power than the recording laser beam) on the optical disc having data recorded in the above described manner, read out data is demodulated by a signal reproduction processing circuit 30 and is provided directly as a digital signal or is provided after being converted to an analog signal by a digital-to-analog converter 32.

Figure 15:
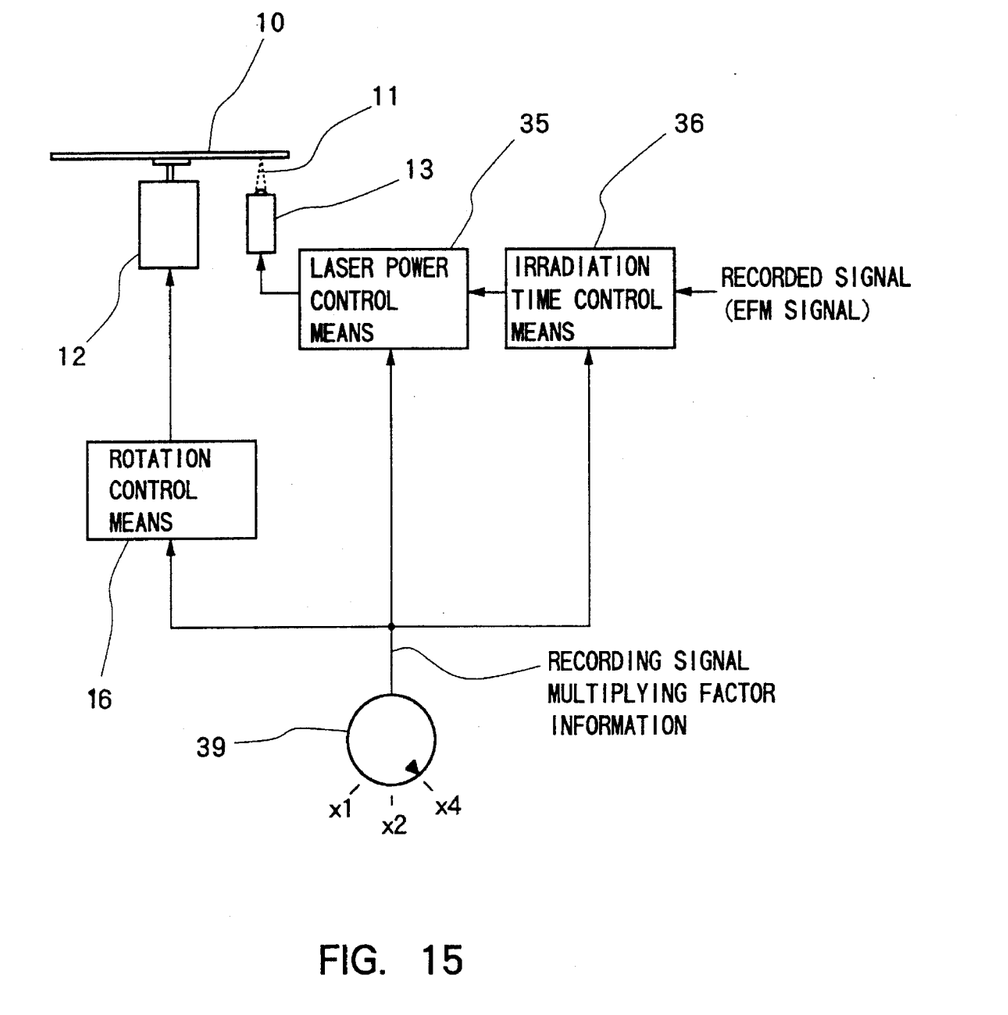
FIG. 15 is a control block diagram in the optical disc recording and reproducing device of FIG. 14.

A control block diagram of the optical disc recording device according to the invention is shown in FIG. 15.

Recording speed multiplying factor means 39 (the input unit 28 in FIG. 14) sets the recording speed multiplying factor by an unillustrated operator. Rotation control means 16 (the disc servo circuit 16 in FIG. 14) rotates and drives the optical disc at the set recording speed multiplying factor.

Figure 1A:
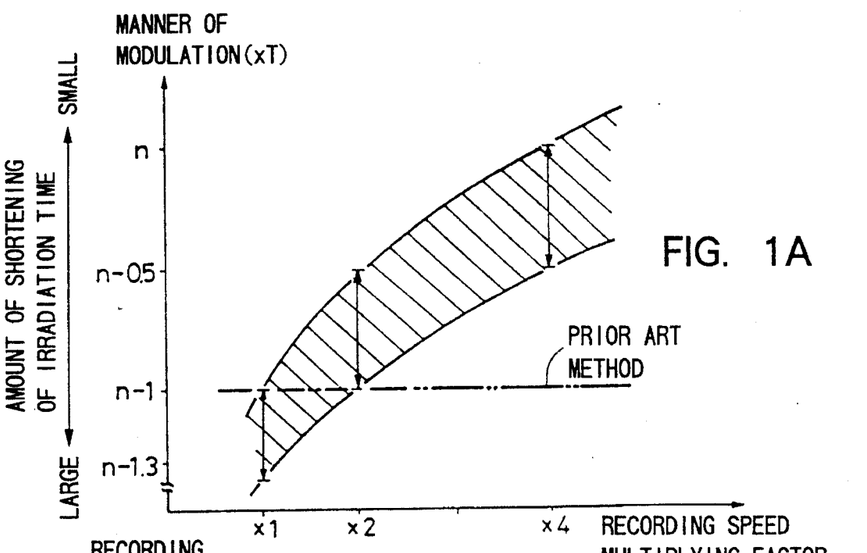
FIG. 1A is a graph showing a manner of modulation with respect to respective recording speed multiplying factors according to the optical disc recording method of the invention.

Irradiation time control means 36 (the data signal correction circuit 26 in FIG. 14) controls the actual irradiation time of recording laser beam 11 by modulating the input FEM signal according to the invention. More specifically, as shown in FIG. 1A, when the set recording speed multiplying factor is small, the ratio of the amount of shortening of the actual irradiation time with respect to the predetermined irradiation time corresponding to length of a pit to be formed is made large whereas when the recording speed multiplying factor is large, the ratio of the amount of shortening is made small.

Figure 1B:
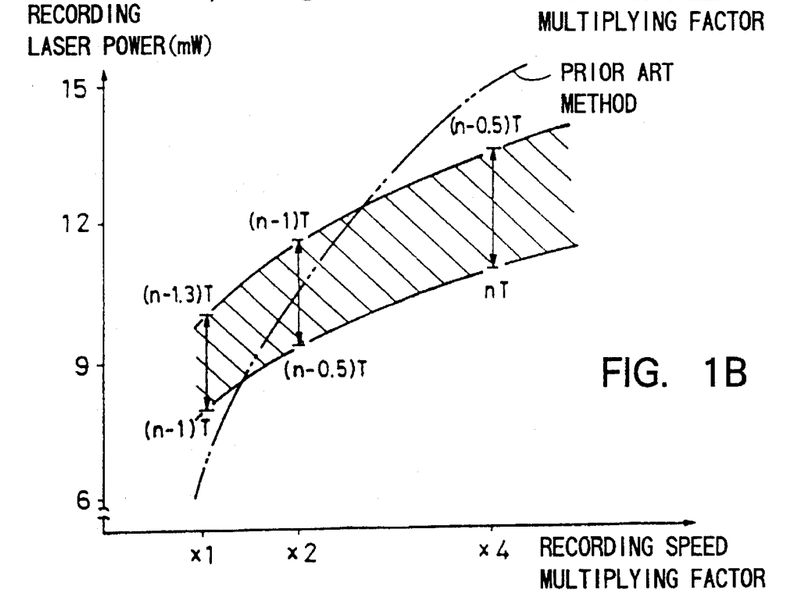
FIG. 1B is a graph showing an example of change of laser power with respect to respective recording speed multiplying factors.

Laser power control means 35 (the laser generation circuit 25 in FIG. 14) controls laser power of the recording laser beam 11 as shown in FIG. 1B for forming a pit of a predetermined pit length within the actual irradiation time determined by the irradiation time control means 36.

In the foregoing manner, a pit of a desired pit length can be formed while preventing increase in crosstalk and jitter.

In the above described embodiment, description has been made about recording data with the CD-WO format. The invention is applicable also to recording data with other format.

In the above described embodiment, description has been made about a case where recording is made on a dye type disc. The invention is applicable also to a metal disc and discs of various other types.

What is claimed is:

1. An optical disc recording device comprising:
   rotation driving means for rotating an optical disc;
   rotation speed controlling means connected to said rotation driving means for controlling a rotational speed of the optical disc;
   data recording means for irradiating a laser beam on the optical disc rotated by said rotation driving means in accordance with digital data to be recorded during an irradiation time, wherein a pit having a length is formed on the optical disc;
   recording speed setting means for designating a desired recording speed, the desired recording speed being a constant linear velocity;
   irradiation time control means for controlling an actual irradiation time of said data recording means in accordance with a recording speed designated by said recording speed setting means, wherein a ratio of the actual irradiation time compared with a predetermined unadjusted irradiation time corresponding to a pit to be recorded is shortened in accordance with the designated recording speed; and
   laser power control means for controlling a laser power level of the laser beam to be irradiated to obtain a predetermined pit length using the actual irradiation time determined by the irradiation time control means.

2. An optical disc recording device as defined in claim 1, wherein said recording speed setting means sets a recording speed multiplying factor to be used by said rotation speed controlling means to drive the optical disc.

3. An optical disc recording device as defined in claim 1, wherein said data recording means comprises an optical head, optical head driving means for driving said optical head, and servo means connected to said optical head for controlling a position of said optical head in a radial direction of the optical disc.

4. An optical disc recording device as defined in claim 1, wherein said irradiation time control means operates in such a manner that, when the desired recording speed is low, the ratio of an amount of shortening of the actual irradiation time with respect to the predetermined unadjusted irradiation time is large, and when the desired recording speed is high, the ratio of the amount of shortening of the actual irradiation time with respect to the predetermined unadjusted irradiation time is small.

5. A method for recording digital data on an optical disc, the method comprising the steps of:
   rotating the optical disc;
   controlling a rotational speed of the optical disc;
   irradiating a laser beam on the rotated optical disc in accordance with digital data to be recorded during an irradiation time, wherein a pit having a length is formed on the optical disc;
   designating a desired recording speed, the desired recording speed being a constant linear velocity;
   controlling an actual irradiation time of the recording laser beam in accordance with the designated recording speed, wherein a ratio of the actual irradiation time compared with a predetermined unadjusted irradiation time corresponding to a pit to be recorded is shortened in accordance with the designated recording speed; and
   controlling a laser power level of the laser beam to be irradiated to obtain a predetermined pit length using the actual irradiation time.

6. A method as defined in claim 5, wherein said step of designating the desired recording speed includes the step of setting a multiplying factor.

7. A method as defined in claim 5, wherein said digital data is recorded with an optical head and the optical head is controlled in a radial direction of the optical disc.

8. A method as defined in claim 5, wherein said step of controlling the actual irradiation time is controlled in such a manner that, when the desired recording speed is low, the ratio of an amount of shortening of the actual irradiation time with respect to the predetermined unadjusted irradiation time is large, and when the desired recording speed is high, the ratio of the amount of shortening of the actual irradiation time with respect to the predetermined unadjusted irradiation time is small.

* * * * *